United States Patent Office 3,140,297
Patented July 7, 1964

3,140,297
PRODUCTION OF CYCLIC ACETALS
AND KETALS
William J. Sullivan, Oakland, and Paul H. Williams,
Orinda, Calif., assignors to Shell Oil Company, New
York, N.Y., a corporation of Delaware
No Drawing. Filed Apr. 30, 1962, Ser. No. 191,281
5 Claims. (Cl. 260—340.7)

This invention relates to the synthesis of cyclic acetals and cyclic ketals of aldehydes and ketones which have a hydroxyl group in alpha-position with respect to the carbonyl carbon atoms. It deals with a new process whereby these compounds can be manufactured more efficiently and economically.

A number of useful methods are available for the production of both cyclic and non-cyclic acetals and ketals from aldehydes and ketones which are not substituted by alpha hydroxyl groups. But ever since the work of John Read on the condensation of pentaerythritol with aldehydes reported in the Journal of the Chemical Society (London), vol. 101, pages 2090–2094 (1912), it has been known that a hydroxyl group in neighboring position to the carbonyl carbon atom inhibits formation of acetals. Similar difficulty is encountered in making ketals of alpha-hydroxyketones by reaction with alcohols. As a result it has been necessary to resort to other starting materials for the production of alpha-hydroxy-substituted acetals and ketals. Thus, for example, alpha,beta-ethylenic aldehydes and ketones have been converted to their acetals or ketals by reaction with alcohols and the resulting ethylenic compounds have been treated to introduce an hydroxyl group on the carbon atom adjacent to that to which the two oxygen atoms are linked. U.S. Patent 2,888,492, for example, describes various methods of producing alpha-hydroxy acetals in this way. Because of the lack of availability of suitable starting ethylenic aldehydes and ketones it is not always feasible to use this method of synthesis. Even when the ethylenic starting compounds are at hand, the cost of the method may make the final alpha-hydroxy acetals and ketals undesirably expensive compared with production from the alcohols and alpha-hydroxy aldehydes and ketones.

An important object of the present invention is the provision of a method for producing alpha-hydroxy cyclic acetals and alpha-hydroxy cyclic ketals from the corresponding alpha-hydroxy aldehydes and ketones, respectively, which avoids the difficulties previously encountered in the manufacture of these compounds. A particular object of the invention is to provide a method for manufacture of cyclic acetals and cyclic ketals having alpha-hydroxyl groups starting with the corresponding alpha-hydroxy aldehydes and ketones and a polyol.

More particularly, the disadvantages of the prior art methods of cyclic acetal and cyclic ketal production are overcome by converting the starting alpha-hydroxyaldehyde or ketone to its cyclic dimer and reacting the dimer with the polyol from which it is desired to make the cyclic acetal or cyclic ketal. The method of the invention, more advantageously, comprises conversion of an alpha-hydroxyaldehyde or alpha-hydroxyketone or mixture of two or more of these to the cyclic dimers which these compounds are known to form, followed by reaction of the resulting dimer with a polyol in the presence of a catalytic amount of acid.

The process is of special advantage for the production of cyclic acetals and cyclic ketals from alpha-hydroxyaldehydes and ketones of the formula

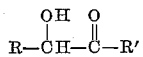

wherein R and R′ represent hydrogen or a hydrocarbon or halogen-, particularly chlorine, bromine or iodine, or hydroxyl- or ether-substituted hydrocarbon group of one to about 10 carbon atoms. Especially useful starting compounds are the alpha-hydroxysaturated aliphatic aldehydes and ketones of the formula

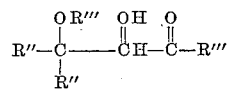

wherein R″ represents hydrogen or lower alkyl, particularly alkyl of 1 to 3 carbon atoms, and R‴ represents hydrogen or a hydrocarbon group, especially a saturated or aromatic hydrocarbon group of 1 to 10 carbon atoms. More specifically the alpha-hydroxy-aldehydes and ketones useful as starting materials according to this invention are those having from 2 to 10 carbon atoms in the molecule and composed of carbon, hydrogen, a single carbonyl oxygen and not more than two hydroxyl oxygen atoms. Especially useful aldehydes of this description are alpha, beta-dihydroxyaldehydes. With starting hydroxy aldehydes or ketones of these preferred types the cyclic dimers used in the process of the invention will have the general formula shown in the following equation for the reaction with a polyol according to the new process:

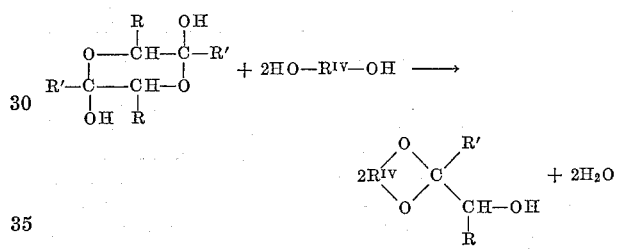

Here $R^{IV}$ represents the divalent radical of the starting polyhydric alcohol. The reaction takes place readily with all polyhydric alcohols which have carbinol groups separated from each other by not more than one carbon atom, the products being cyclic acetals or ketals.

The dimerization of the alpha-hydroxyaldehyde or ketones used as starting material can be carried out in any suitable manner. One convenient method of dimerization comprises aging a solution of the alpha-hydroxyaldehyde or ketone of suitably high concentration, for example, about 40 to 80% wt. until substantial conversion to the dimeric form takes place. Aging at about 0° to about 40° C. is usually effective in aqueous or non-aqueous media. In most cases it is advantageous to age the solution until the dimer crystallizes out. The time which will be required will depend upon the particular starting alpha-hydroxyaldehydes or ketone used and the amount and nature of the impurities in the solution employed. Generally aging periods of about ten days or less are sufficient. The reaction with the chosen polyol is then carried out with the separated crystalline cyclic dimer.

The polyols which are useful for making acetals and ketals according to the invention can be saturated or unsaturated, aliphatic or cyclic polyols including alicyclic, aromatic or heterocyclic compounds. Polyhydroxy hydrocarbons having two to about eighteen carbon atoms are suitable. Polyols which contain substituents which are unreactive under the conditions of operation are also useful in the new process. Substituents of this kind include halogen atoms, particularly chlorine, bromine, fluorine or iodine atoms, ether groups including thioether groups, ester groups, and the like. Saturated aliphatic polyhydric alcohols of one to ten carbon atoms per molecule are generally useful. The preferred polyols are those having two carbinol groups which are separated by not more than one carbon atom and contain from 2 to 10 carbon atoms per molecule, particularly the compounds of this type having 5 to 10 carbon atoms and at least one pair of carbinol groups separated by at least two carbon atoms from any other carbinol group in the molecule.

As previously indicated the reaction between the polyol and cyclic dimer is catalyzed by acid. Any of the acids known to catalyze acetal and ketal formation with un-substituted aldehydes and ketones are suitable for the new reaction. Sulfo acids such as sulfuric, para-toluene sulfonic acid, ethanesulfonic acid and the like are especially useful, but phosphoric acid, hydrogen chloride, nitric acid and other strong inorganic acids are also effective. The acid can be advantageously used in solution or suspension in the reaction mixture or can be employed on a support. Highly porous solid carriers having a surface area of at least 75 square meters per gram are useful supports. Silica gel, kieselguhr, diatomaceous earth, porous aluminas and the like can be used in this way, preferably using about 0.025 to about 1 millimole of acid per unit weight of carrier. Amounts of acid between about 0.02 and about 0.1 mol percent based upon the cyclic dimer present are usually preferable in the reaction mixture.

The reaction of the dimerized alpha-hydroxy-aldehyde or ketone is advantageously carried out by heating the reactants to about 50 to 100° C. Ordinary atmospheric pressure or superatmospheric or reduced pressure can be used. One especially useful method of operation is reaction under conditons at which the water formed is continuously removed from the mixture. This is facilitated by reaction in the presence of an organic liquid which is not reactive under the conditions of operation and which forms an azeotrope with water which can be distilled off from the reaction mixture as fast as the water is produced. Refluxing with hydrocarbons such as hexane, benzene, toluene, etc. or with dichloroethylene, or ethyl ether or the like is one suitable method of operation in this way. By this modification of the invention the reaction can be carried to substantial completion, as shown by removal of the theoretical amount of water, without need for using an excess of either reactant. By employing approximately stoichiometric proportions of polyol and cyclic dimer the need for recovery and recycling of un-reacted materials is avoided. However, it is feasible to use other proportions of the reactants. Amounts of polyol corresponding to about one-fourth to about ten times the stoichiometric requirement for the reaction can be used for example. Excess of water-insoluble polyol reactant can, in some cases, be used as azeotroping agent for removal of water during the reaction.

Upon termination of the reaction, which under the preferred conditions, usually is complete in about 2 to about 5 hours, the alpha-hydroxy cyclic acetal and/or ketal can be recovered by distilling the reaction mixture. Where, as is preferred, an azeotroping agent lower boiling than the product is used, it is taken off first, as is any unreacted polyol, and the product is then distilled overhead at ordinary or reduced pressure. Extraction and/or other known methods of acetal and ketal recovery and purification can also be used.

Further details of suitable procedures for carrying out the invention are shown in the following examples, wherein parts and percentages are by weight unless otherwise designated.

EXAMPLE I

Glyceraldehyde 2-Methyl-2,4-Pentanediol Acetal

An aqueous solution of glyceraldehyde of about 70% concentration was aged for about 10 days until crystallization of glyceraldehyde cyclic dimer (2,5-dihydroxy-3,6-hydroxymethyl-1,4-dioxane) from the solution was substantially complete when the dimer was separated by filtration and air dried. Eighteen grams or 0.1 mole of this crystalline dimer was added to a refluxing homogeneous solution of 236 grams (2.0 moles) of 2-methyl-2,4-pentanediol, 400 ml. of benzene and 0.5 gram of para-toluenesulfonic acid in a flask equipped with a stirrer and reflux condenser having a phase separator for removal of water. Over the course of three hours, most of the water of reaction was azeotropically removed (about 3.8 ml.). The benzene was then distilled off and the residue was distilled at reduced pressure to give 31.8 g. (83.5% of theoretical yield), B.P. 89–90° C. (0.4 mm.), $n_D^{25}$ 1.4595, which analyzed as the glyceraldehyde 2-methyl-2,4-pentanediol acetal:

|  | Found | Theory ($C_9H_{18}O_4$) |
|---|---|---|
| C | 56.9 | 56.84 |
| H | 9.7 | 9.48 |
| α-Glycol, eq./100 g | 0.50 | 0.526 |
| Total Carbonyl,ᵃ eq./100 g | 0.521 | 0.526 |

ᵃ After hydrolysis at 80° C. for one hour.

EXAMPLE II

Glyceraldehyde Ethylene Glycol Acetal

Using the same procedure as in Example I, a mixture of 124 g. (2.0 moles) of ethylene glycol, 18 g. (0.2 mole) of the same crystalline glyceraldehyde dimer, 300 ml. of benzene and 1 gram of p-toluenesulfonic acid was refluxed in a flask equipped with a Dean-Stark trap. At the completion of water removal, the excess benzene was distilled off, the catalyst was pacified with sodium acetate, and the product was distilled in a Claisen still to give 12.8 g. (48% yield), B.P. 101° C. (1 mm.), $n_D^{20}$ 1.4619, which analyzed as the glyceraldehyde ethylene glycol acetal.

|  | Found | Theory ($C_5H_{10}O_4$) |
|---|---|---|
| C | 44.4 | 44.77 |
| H | 7.7 | 7.46 |
| Hydroxyl, eq./100 g | 1.57 | 1.49 |
| α-Glycol, eq./100 g | 0.771 | 0.746 |
| Carbonyl, eq./100 g,ᵃ | 0.311 | 0.746 |

ᵃ After hydrolysis at 80° C. for one hour.

EXAMPLE III

Glyceraldehyde Hexanetriol Acetal

Reaction as in Examples I and II but using 1,2,6-hexanetriol in the same way as the alcohol reactant results in an equally good yield of the glyceraldehyde hexanetriol acetal

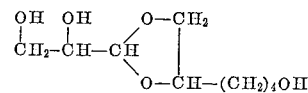

EXAMPLE IV

Beta-Chlorolacetaldehyde Ethylene Glycol Acetal

Beta-chlorolactaldehyde solution was made by reacting a chloroform solution of anhydrous glycidaldehyde with cold etherial hydrogen chloride at 5° C. and the dimer of the beta-chlorolactaldehyde, M.P. 136–137° C. with decomposition, was obtained from the product. The crystalline dimer (10.9 grams or 0.05 mole) was charged to a 300 ml. round-bottom flask equipped with a Dean-Stark trap, a reflux condenser and magnetic stirrer. Then there were added 6.2 g. (0.1 mole) of ethylene glycol, 200 ml., of benzene and 0.13 g. of p-toluenesulfonic acid. The reaction mixture was heated overnight at reflux with stirring during which time 2 ml. of water was collected in the trap. After removal of the benzene by distillation, the residue was treated with one gram of sodium acetate and Claisen-distilled to give 12.2 g. (80% yield) of material which analyzed as β-chlorolactaldehyde ethylene glycol acetal, B.P. 79–80° C. (<1 mm.), $n_D^{25}$ 1.4772:

|  | Found | Theory ($C_5H_9O_3Cl$) |
|---|---|---|
| C | 39.9 | 39.4 |
| H | 6.1 | 5.9 |
| Hydroxyl, eq./100 g | 0.68 | 0.751 |

EXAMPLE V

*Glyceraldehyde Trimethylene Glycol*

Reacting equal mole proportions of glyceraldehyde dimer and trimethylene glycol by the method of Example IV gives glyceraldehyde trimethylene glycol acetal,

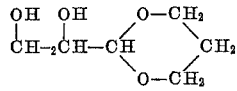

EXAMPLE VI

*Dihydroxyacetone Hexylene Glycol Ketal*

Substituting an equal molecular amount of dimeric dihydroxyacetone (2,5 - dihydroxy - 2,5-hydroxymethyl-1,4-dioxane) for the glyceraldehyde dimer in the process of Example I affords dihydroxyacetone ethylene glycol ketal

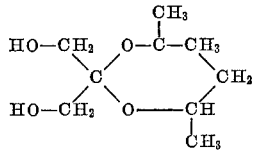

As previously indicated the process of the invention is broadly applicable to the production of cyclic acetals and ketals of alpha-hydroxyaldehydes and alpha-hydroxyketones and can be carried out with polyhydroxyalcohols of all kinds. But the new process is especially advantageous when using alpha-hydroxy saturated aliphatic aldehydes and ketones having 3 to 6 carbon atoms and composed of carbon, hydrogen, a single carbonyl oxygen and not more than two hydroxyl oxygen atoms as starting material. In addition to the alpha-hydroxy aldehydes and ketones shown in the foregoing examples, one can similarly convert to cyclic acetals and ketals dimers of the following: glycolic aldehyde, alpha-hydroxy propionaldehyde, alpha-hydroxyisobutyraldehyde, monohydroxyacetone, ethyl ketol, dimethyl ketol, 3-hydroxyhexanone-4, and the like. Specific polyols which can be reacted by the methods of the foregoing examples with cyclic dimers of these and other alpha-hydroxyaldehydes and ketones include, in addition to the exemplified polyols, 2,3-butanediol, 2-methyl-2,3-butanediol, pinacol, 2,4-dimethyl-2,4-butanediol, 3-methyl-5-ethyl-3,5-heptanediol, glycerol, 1,2,5,6 - hexanetetrol, sorbitol, glycerol monochlorohydrin, alpha-phenyl glycerol, 1,2-dihydroxycyclohexane, 1-hydroxyhexahydrobenzyl alcohol, and the like for example.

It will thus be seen that the new process is capable of considerable variation not only with respect to the methods which can be used in preparing the cyclic dimers and in reacting them with the chosen polyol or polyols but also in regards to the cyclic dimers of alpha-hydroxyaldehydes and ketones which can be used and the polyols which can be reacted therewith. It will therefore be understood that the invention is not limited to the examples which have been given by way of illustration only, nor by any theory proposed in explanation of the improved results which are obtained.

We claim as our invention:

1. The process for preparing a cyclic acetal of an alpha-hydroxyaldehyde having from 2 to 10 carbon atoms per molecule and composed of carbon, hydrogen, a single carbonyl oxygen and not more than two hydroxyl oxygen atoms which comprises reacting a cyclic dimer of said aldehyde with a saturated aliphatic polyhydric alcohol having two carbinol groups which are separated by not more than one carbon atom and containing from 2 to 10 carbon atoms per molecule in the presence of an acid catalyst.

2. The process of claim 1 wherein the aldehyde is an alpha-beta-dihydroxy aldehyde.

3. The process of claim 1 wherein the aldehyde is glyceraldehyde and the polyhydric alcohol is selected from the group consisting of ethylene glycol, 2-methyl-2,4-pentanediol, 1,2,6-hexanetriol and trimethylene glycol.

4. The process for preparing a cyclic ketal of an alpha-hydroxy ketone having from 3 to 10 carbon atoms per molecule and composed of carbon, hydrogen, a single carbonyl oxygen and not more than two hydroxyl oxygen atoms which comprises reacting a cyclic dimer of said ketone with a saturated aliphatic polyhydric alcohol having two carbinol groups which are separated by not more than one carbon atom and containing from 2 to 10 carbon atoms per molecule in the presence of an acid catalyst.

5. The process of claim 3 wherein the ketone is dihydroxy acetone and the polyhydroxy alcohol is ethylene glycol.

No references cited.